United States Patent
Mao et al.

(10) Patent No.: US 10,250,523 B2
(45) Date of Patent: Apr. 2, 2019

(54) UNIFIED BANDWIDTH MANAGEMENT ON DISTRIBUTED NETWORK ENVIRONMENT

(71) Applicant: SonicWall US Holdings Inc., Santa Clara, CA (US)

(72) Inventors: Miao Mao, Shanghai (CN); Deepa Thilakavani Sounderraj, San Jose, CA (US); Zhong Chen, San Jose, CA (US)

(73) Assignee: SONICWALL INC., Milpitas, CA (US)

( * ) Notice: Subject to any disclaimer, the term of this patent is extended or adjusted under 35 U.S.C. 154(b) by 510 days.

(21) Appl. No.: 14/645,383

(22) Filed: Mar. 11, 2015

(65) Prior Publication Data

US 2016/0269314 A1 Sep. 15, 2016

(51) Int. Cl.
*H04L 12/927* (2013.01)
*H04L 12/911* (2013.01)
*H04L 12/923* (2013.01)

(52) U.S. Cl.
CPC ............ *H04L 47/801* (2013.01); *H04L 47/72* (2013.01); *H04L 47/762* (2013.01)

(58) Field of Classification Search
CPC ............ G06Q 30/016; H04B 2203/545; H04B 2203/5408; H04B 2203/5441; H04B 2203/5445; H04B 3/542; H04J 3/1682; H04L 12/1417; H04L 12/1435; H04L 43/10; H04L 43/50; H04L 43/0811; H04L 47/15; H04L 47/70; H04L 47/72; H04L 47/745; H04L 47/762; H04L 47/801; H04L 47/805; H04L 47/822; H04L 41/5003; H04L 41/5009; H04L 41/5029; H04L 43/16; H04L 43/026; H04L 43/087; H04L 43/106; H04L 43/0829; H04L 43/0864; H04L 45/50; H04M 15/66; H04M 15/852; H04W 4/06; H04W 4/24; H04W 28/20; H04W 28/22; H04W 72/121; H04W 72/0453; H04W 76/02; H04W 76/025; H04W 84/20; Y02B 60/33
See application file for complete search history.

(56) References Cited

U.S. PATENT DOCUMENTS

| | | | | |
|---|---|---|---|---|
| 2004/0184406 | A1* | 9/2004 | Iwamura | H04B 3/542 |
| | | | | 370/235 |
| 2005/0132044 | A1* | 6/2005 | Guingo | H04L 41/5009 |
| | | | | 709/225 |
| 2009/0234932 | A1* | 9/2009 | Hamada | H04W 84/20 |
| | | | | 709/208 |
| 2010/0316028 | A1* | 12/2010 | Allen | H04W 28/20 |
| | | | | 370/336 |
| 2012/0106359 | A1* | 5/2012 | Raszuk | H04L 43/0811 |
| | | | | 370/244 |

(Continued)

*Primary Examiner* — Clayton R Williams
*Assistant Examiner* — Michael Li
(74) *Attorney, Agent, or Firm* — Polsinelli LLP (57) ABSTRACT

The present invention provides systems and methods for unified bandwidth management for network traffic. In particular, two or more network devices may be grouped into a single set, and bandwidth management is performed on the single set. The grouping of network devices into a single set facilitates dynamic adjustment of bandwidth management based on real-time variations in network traffic that may arise during standard operations of the network.

17 Claims, 5 Drawing Sheets

(56) References Cited

U.S. PATENT DOCUMENTS

2012/0263083 A1* 10/2012 Zhou .................. H04W 72/121
370/310
2013/0305322 A1* 11/2013 Raleigh ................ G06Q 30/016
726/4

* cited by examiner

UNIFIED BANDWIDTH MANAGEMENT ON DISTRIBUTED NETWORK ENVIRONMENT

BACKGROUND

Field of Invention

The present invention generally relates to network bandwidth management. More specifically, the present invention relates to systems and methods directed at performing a unified bandwidth management of traffic in a network.

Description of the Related Art

Bandwidth management (BWM) is a process implemented in networks for measuring and controlling communications (e.g., traffic, packets) in a network between a first point and a second point. For example, it may be desired to provide a better network performance for high priority traffic between the first point and second point across some network links and lower a transmission rate of non-critical traffic across other network links.

It should be noted that between the two points in a network, there may exist a plurality of different available network links that can be used by the network to transmit communications from the first point to the second point. BWM may be configured to avoid allocating more than a predetermined amount of communications (e.g., traffic, packets) that can be handled by the available network links between the two points, as allocating more may result in a particular network link filling to capacity or even overfilling. Such situations may result in congestion in the network and therefore may create poor overall performance in the network.

SUMMARY OF THE CLAIMED INVENTION

Embodiments of the present invention include systems and methods for unified bandwidth management for network traffic. In particular, two or more network devices may be grouped into a single set, and bandwidth management is automatically performed on the single set. The grouping of network devices into a single set facilitates dynamic adjustment of bandwidth management based on real-time variations in network traffic that may arise during standard operations of the network.

DETAILED DESCRIPTION

Systems and methods for unified bandwidth management are described herein. In the following description, details are provided to explain various embodiments of the present invention. It should be noted, however, that the present invention may be practiced without some of the details provided. Some details may also be omitted for sake of simplifying/generalizing a particular embodiment of the present invention.

Reference to embodiments of the present invention within the specification may mean that a particular feature, structure, or characteristic described in connection with the embodiment is included in at least one embodiment of the invention. There may be, however, other embodiments where that same feature, structure, or characteristic is not included but is still within the scope of the present invention.

Figure 1:
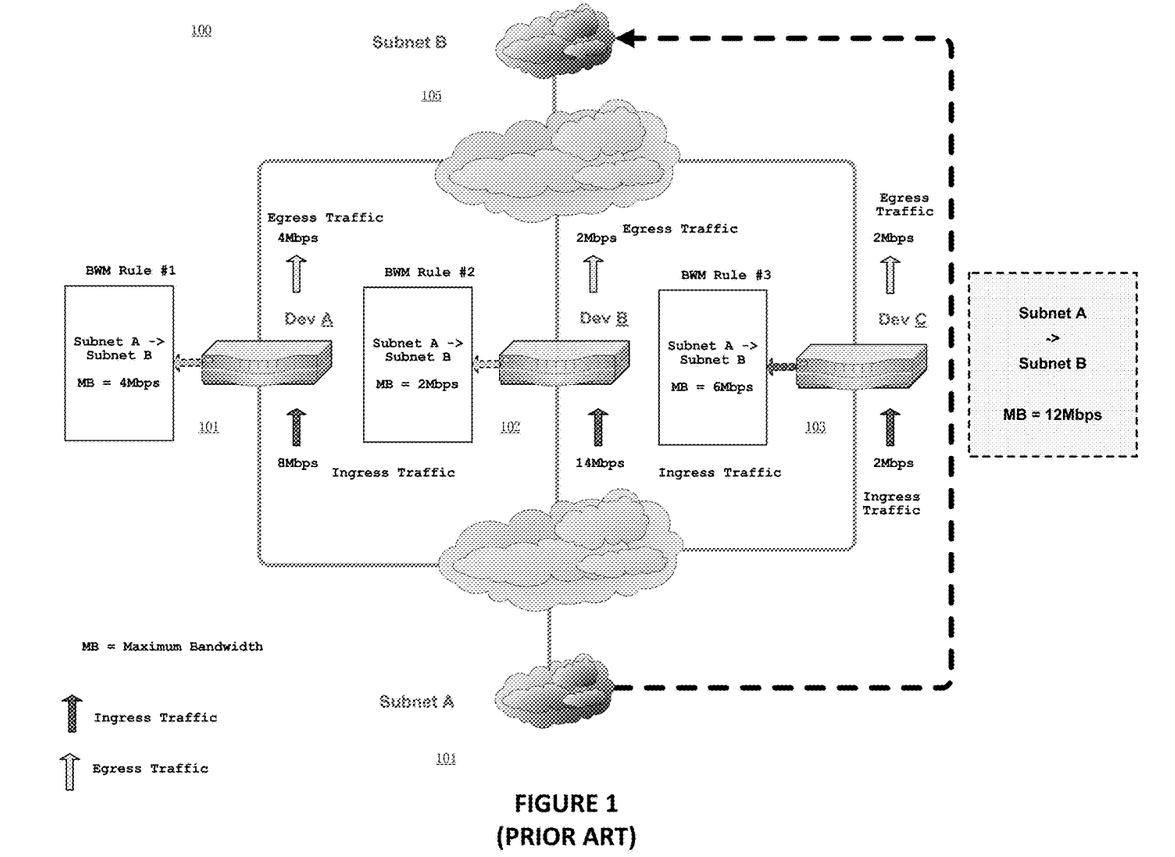
FIG. 1 illustrates a prior art implementation of bandwidth management.

FIG. 1 illustrates traditional (prior art) implementation of bandwidth management. In a typical network deployment, a plurality of network devices (e.g., routers, switches, gateways, network bridges, hubs, and repeaters) can be distributed in a mesh structure. The mesh structure may utilize a plurality of nodes (also referred to as mesh nodes) that can relay data from one point to another. The plurality of nodes—where each node may be represented by a single network device—in the mesh network can cooperate to propagate messages along a path between an originating node to a destination node by moving the data from node to node until the destination node is reached. It should be noted that each node may possess its own configured rules (e.g., maximum bandwidth allowed through the node). Generally, these rules may be set by an administrator designating a particular performance standard for that node when the node first joins the network. For example, a particular node may be assigned a maximum bandwidth that can pass through that particular node. Such rules may also be adjusted as needed based on the operation of the network.

FIG. 1 illustrates such an exemplary mesh structure 100 that includes three bandwidth management enabled network devices A-C 101-103 that can be used to propagate messages between subnet A 104 and subnet B 105. Each of the network devices 101-103 may have their own respective pre-defined rules related to a maximum bandwidth of that particular device. In FIG. 1, for example, network device A 101 has a maximum bandwidth of 4 Mbps, network device B 102 has a maximum bandwidth of 2 Mbps, and network device C 103 has a maximum bandwidth of 6 Mbps. An overall maximum bandwidth for the mesh structure 100 can then be 12 Mbps.

The overall maximum bandwidth for the mesh structure 100 can be achieved by taking a sum of the maximum bandwidth across each available network device in the mesh structure 100. This can correspond to the situation that all available network devices handle their respective maximum bandwidth load simultaneously. In other words, the maximum bandwidth for the mesh structure 100 may correspond, for any one point in time, the maximum traffic of all of the network devices 101-103 simultaneously operating within the mesh structure 100.

Also illustrated in FIG. 1 is an overall total amount of traffic that the mesh structure 100 may experience. In particular, the mesh structure 100 is shown to be experiencing a total of 24 Mbps of total incoming traffic.

It should be noted that each of the network devices 101-103 can be individually programmed to have a maximum bandwidth, as illustrated in FIG. 1. For bandwidth adjustments to be made to the overall network (e.g., adjusting which network device has what maximum bandwidth), an administrator may need to design how bandwidth is to be distributed and configure each network device to fit within that new bandwidth distribution. Given that these networks may include many network devices (e.g., hundreds), frequent adjustments can be time-consuming or cumbersome.

Another issue can also arise from the static nature of each network device. Once configured by the administrator, each network device may generally possess a static maximum bandwidth that may not be able to react to real-time traffic variations in the network. As illustrated in FIG. 1, the network devices A, B and C 101-103 have static maximum bandwidths (e.g., 4 Mbps, 2 Mbps, and 6 Mbps, respectively). In some situations, some network devices may not fully utilize their maximum bandwidth (e.g., network device C 103) when some other network devices have fully exhausted their allotted bandwidth (e.g., network devices A 101 and B 102).

Embodiments of the present invention address the above issues by grouping multiple network devices into a single set and performing bandwidth management within that set. Each network device within a bandwidth management set may be dynamically adjusted based on real-time traffic variations in the network without need for an administrator to manually or separately configure each and every individual network device.

Such unified bandwidth management may involve creating or designating a bandwidth management set, which can be a group of two or more network devices. Each bandwidth management set may have a unique set identification that is used to identify one set from other sets.

Within each set of network devices, one network device can be designated as a set master. The set master can be in charge with overall set configuration management and distribution. In some embodiments, the first network device (element) in each set will become the set master automatically. Alternatively, a variety of parameters known in the part may be used to select or designate which network device is to become the set master.

Within the same set, each network device may be capable of figuring out the identity of other members within the same set, characteristics about that particular member (e.g., maximum allotted bandwidth), and any runtime information about that particular member (e.g., incoming traffic volume). In fact, the list of each member within the set-as well as information about each member—can be populated in memory, updated on a frequent basis, and communicated to other members. In this way, each of the members within the bandwidth management set can access the information and the performance of each member can be self-adjusted based on the updated information.

It should be noted that network devices can join and leave sets at any time, thereby necessitating frequent updates to the member information in the set. Each network device can also join multiple bandwidth management sets. This may be possible in practice when applied to the mesh structure, because there may be multiple paths whereby data can be transmitted between two points in the network. A single node (or network device) may facilitate transmitting data for a variety of different paths. For each bandwidth management set that a network device joins, that particular network device may have corresponding characteristics and runtime information that are unique to that set.

Bandwidth management rules can identify traffic subject to bandwidth management. Such bandwidth management rules can also be related to various bandwidth parameters (e.g., maximum bandwidth, guaranteed bandwidth). Each bandwidth management set can have multiple bandwidth management rules.

The set bandwidth is a total sum of all maximum or guaranteed bandwidth of each network device in a particular bandwidth management set. Generally, the set bandwidth is a static parameter that is configured by the administrator of the network.

An element bandwidth corresponds to real-time runtime maximum or guaranteed bandwidth of a bandwidth management rule for a particular element (network device). Generally, the element bandwidth is dynamic and may be adjusted based on the set bandwidth (maximum/guaranteed bandwidth) and real-time traffic distribution across the elements (network devices) in the set.

Figure 4:
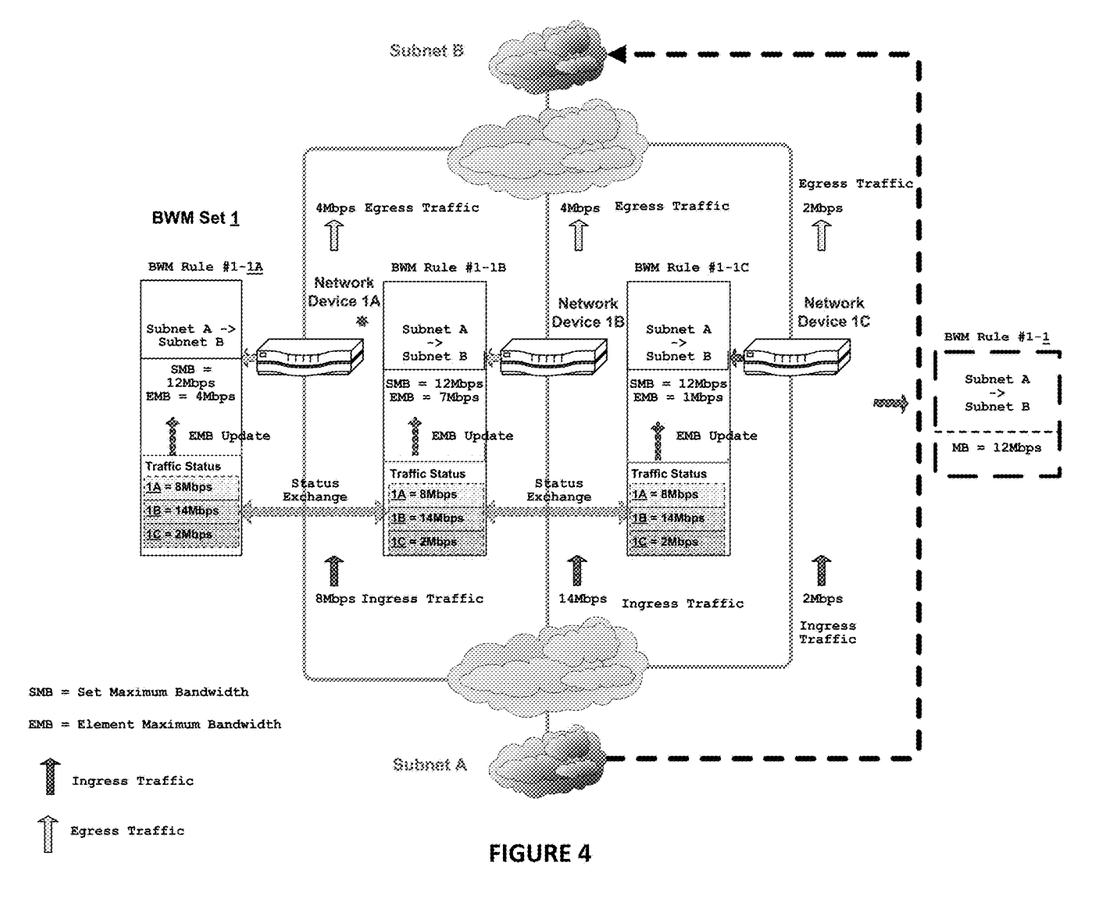
FIG. 4 illustrates an exemplary traffic status exchange and bandwidth distribution calculation process that may be used in an exemplary system for unified bandwidth management.
Figure 5:
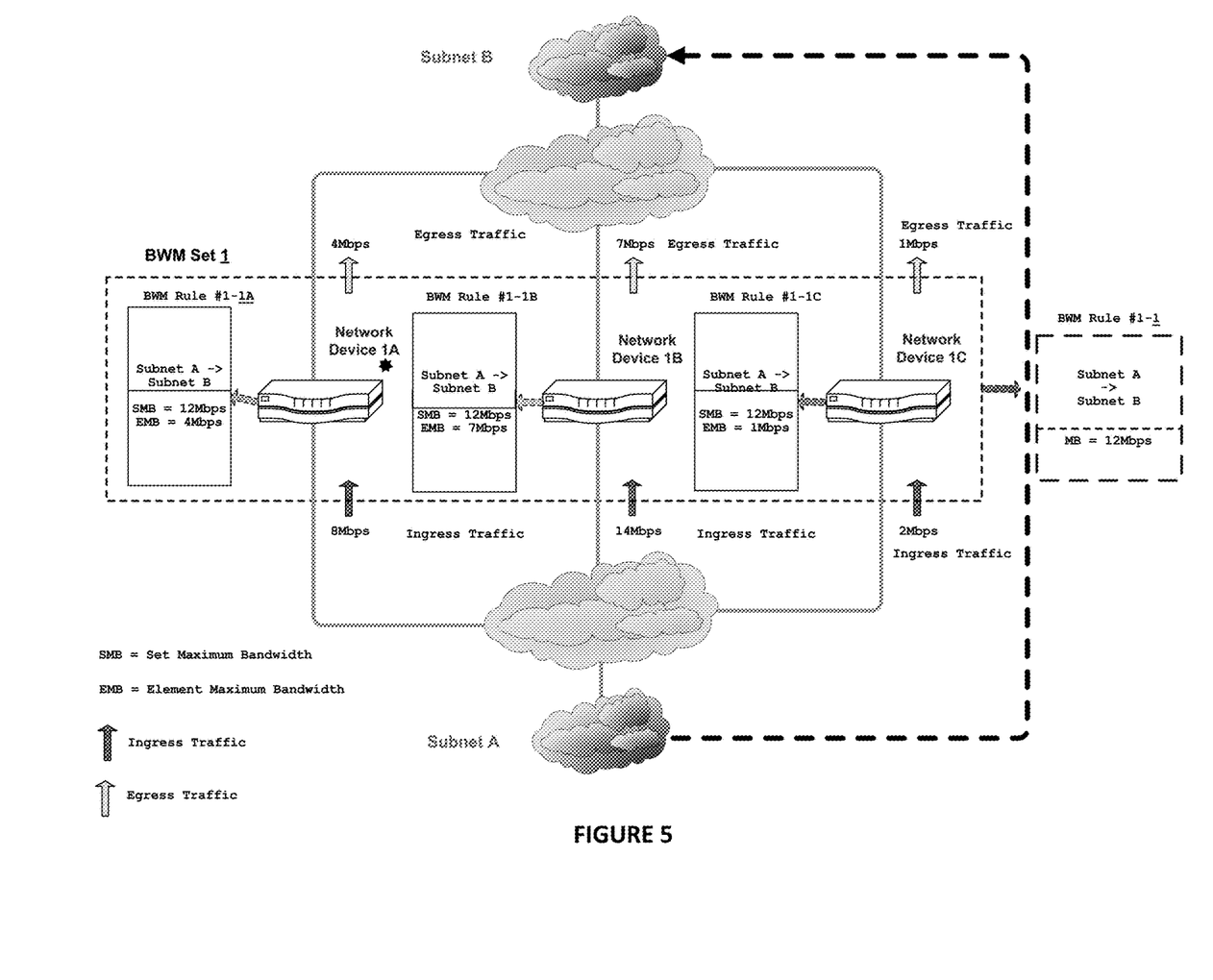
FIG. 5 illustrates an exemplary bandwidth management per element bandwidth process that may be used in an exemplary system for unified bandwidth management.

Unified bandwidth management can be implemented through bandwidth management set join (FIG. 2), bandwidth management rule initialization (FIG. 3), traffic status exchange and bandwidth distribution calculation (FIG. 4), and bandwidth management per element bandwidth (FIG. 5). Further details about each step will be provided below in each of their respective figures.

Figure 2:
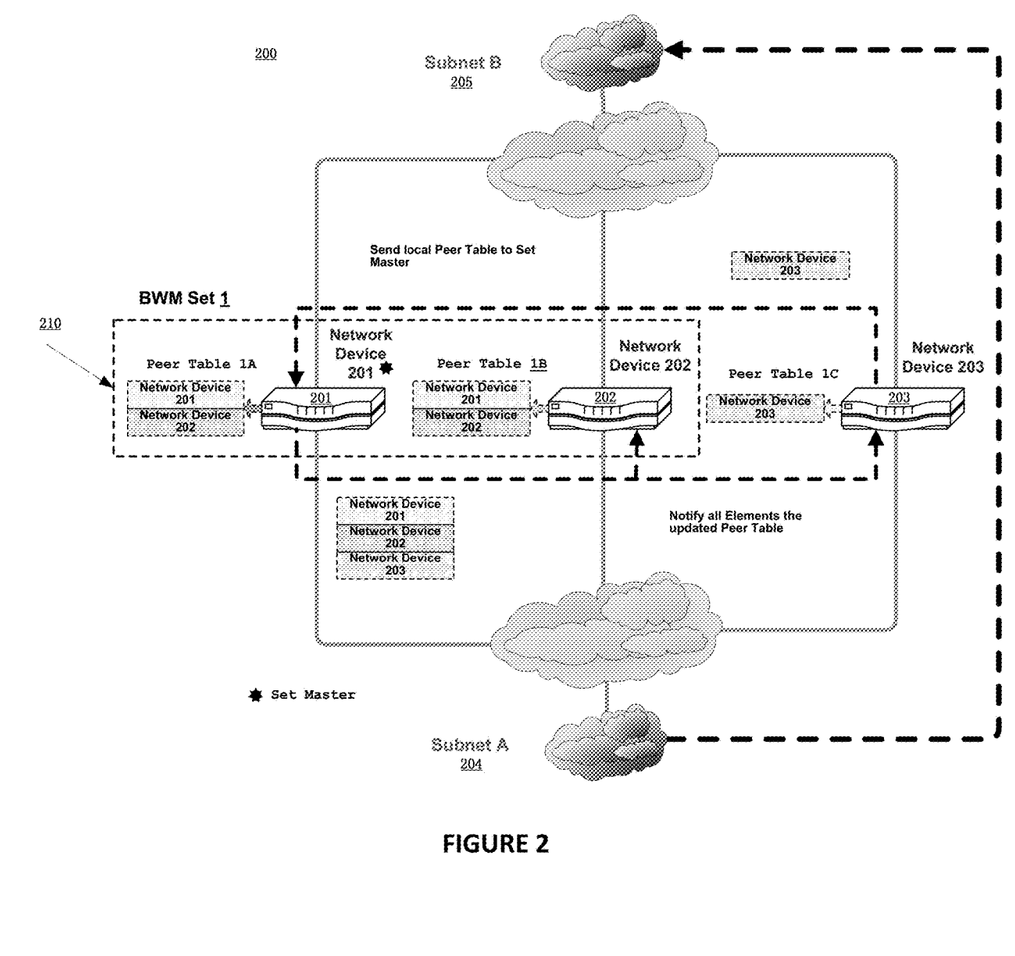
FIG. 2 illustrates an exemplary bandwidth management set join process that may be used in an exemplary system for unified bandwidth management.

FIG. 2 illustrates an exemplary bandwidth management set join process that may be used in an exemplary system for unified bandwidth management. The illustrated network 200 uses the same topology as that illustrated in FIG. 1: three network devices 201, 202, and 203 that transmit data between subnet A 204 and subnet B 205. Compared to the prior art where each of the network devices 201, 202, and 203 are independently configurable network devices, FIG. 2 illustrates an exemplary bandwidth management set 210 that initially contains network device 201 and network device 202. Network device 201 is designated as the set master of the bandwidth management set 210.

As illustrated in FIG. 2, each of the network devices 201, 202, and 203 within the bandwidth management set 210 may individually maintain a peer table that includes all elements within the particular bandwidth management set. The peer table may also indicate the identity of the set master of the bandwidth management set 210 as well.

In the set join process, bandwidth management set may wish to add additional elements. As illustrated in FIG. 2, network device 203 is attempting to join the bandwidth management set 210. In order to join a particular bandwidth management set, the added network device may need the identity of the set master. This is so that the additional network device may provide its peer table to be incorporated to the overall peer table maintained by the set master of the bandwidth management set.

Where network device 203 is seeking to join the bandwidth management set as illustrated in FIG. 2, network device 203 may provide its peer table to the set master (e.g., network device 201) of the particular bandwidth management set it wishes to join. Upon receipt of the peer table of network device 203, an updated peer table can be generated by the set master (e.g., network device 201). The updated peer table can then be distributed to the other network devices (e.g., elements 202 and 203) in the bandwidth management set 210. The updated peer table may now include the newly-added network device 203 as part of the bandwidth management set 210, in addition to the pre-existing members of the bandwidth management set 210 (e.g., network devices 201 and 202).

Once the membership of the bandwidth management set has been updated, the network can then perform rule initialization. Rule initialization pertains to configuring an initial bandwidth for each of the elements within the bandwidth management set based on the total maximum or guaranteed bandwidth allocated for the bandwidth management set.

Figure 3:
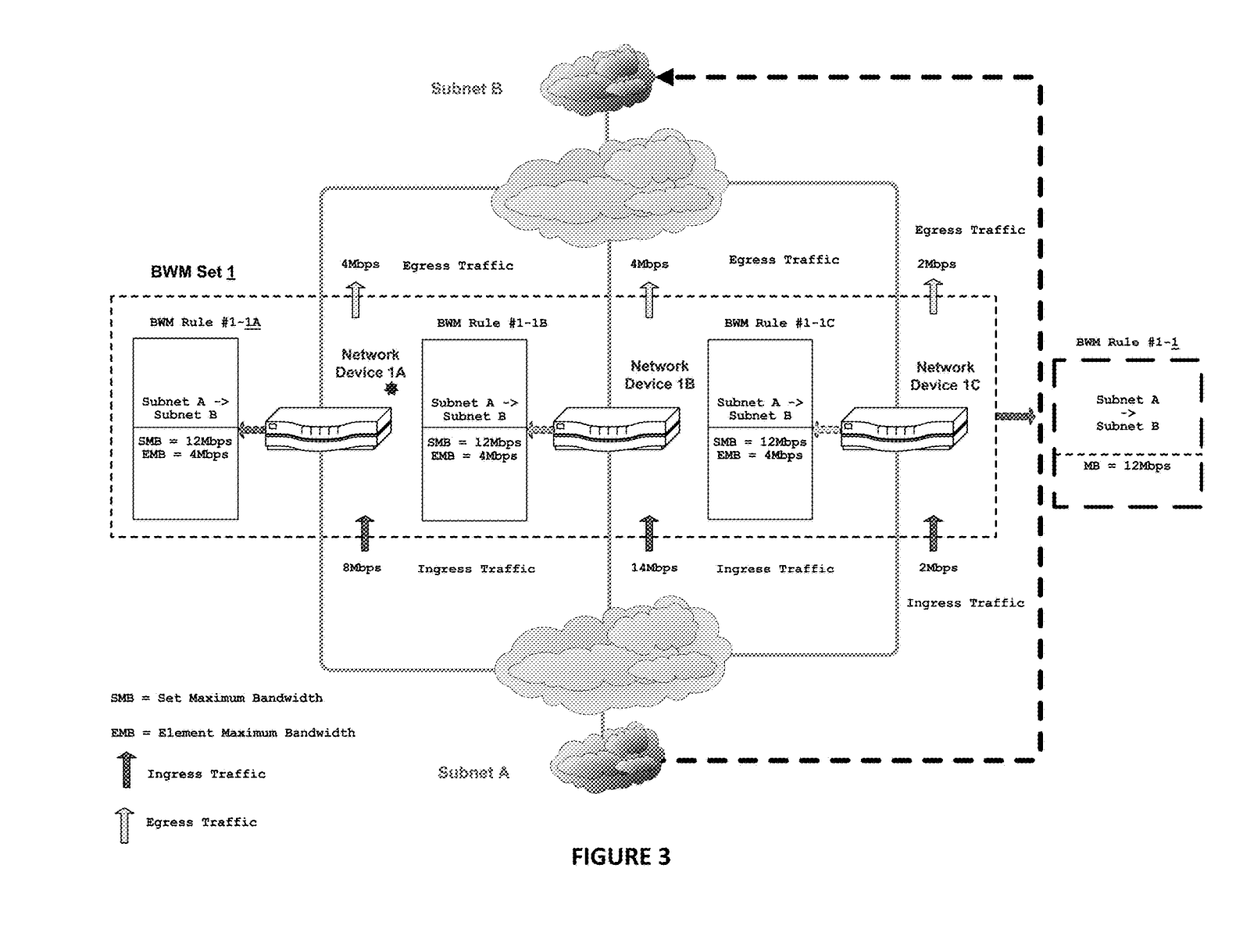
FIG. 3 illustrates an exemplary rule initialization process that may be used in an exemplary system for unified bandwidth management.

FIG. 3 illustrates an exemplary rule initialization process that may be used in an exemplary system for unified bandwidth management. As illustrated, the bandwidth management set has a configured maximum bandwidth of 12 Mbps. Information about the maximum bandwidth for the bandwidth management set is provided to each element within that bandwidth management set. Each element or device can then be assigned an initial maximum bandwidth. The initial maximum bandwidth may be calculated based on the maximum bandwidth for the bandwidth management set and the number of elements within that bandwidth management set. As illustrated in FIG. 3, there are 3 elements (e.g., 1A-1C) with a total maximum bandwidth for the bandwidth management set of 12 Mbps, therefore resulting an initial maximum bandwidth of 4 Mbps for each element (e.g., 1A-1C) in the bandwidth management set.

Similar to the traffic illustrated in FIG. 1, the network of FIG. 3 may be experiencing ingress of 24 Mbps of traffic going from subnet A to subnet B. The traffic, however, may not evenly be distributed across the three network devices 1A-1C (e.g., 8 Mbps per network device). It may be possible that the allocated maximum bandwidth is greater than what is required for some devices (e.g., network device 1C), while other network devices (e.g., devices 1A and 1B) do not have enough. Further, traffic patterns can also change and create a situation where a different network device (e.g., device 1A) can have excess bandwidth while other network devices are overflowing. In these situations, the network may not be using its allotted maximum bandwidth efficiently.

Unified bandwidth management process may further include looking at the incoming traffic at each network device and adjusting the maximum bandwidth of each network device (e.g., 1A-1C) accordingly and without requiring input or action from a network administrator. Although the maximum bandwidth may be distributed across each network device within the bandwidth management set, the overall maximum bandwidth (e.g., as initially defined for the entire bandwidth management set) may not be exceeded unless it is changed by the network administrator.

FIG. 4 illustrates an exemplary traffic status exchange and bandwidth distribution calculation process that may be used in an exemplary system for unified bandwidth management. Real-time traffic across each network device within the bandwidth management set may be evaluated and used to reallocate the maximum bandwidth for each network device to handle the incoming traffic more efficiently.

Each of the network devices (e.g., 1A-1C) may also maintain a traffic status table, which may be part of or otherwise associated with the peer table. The traffic status table records the latest real-time traffic status of all the network devices in the bandwidth management set. This information can be updated from local statistics and distribution messages from peers within the bandwidth management set.

Each of the network devices within the bandwidth management set (e.g., 1A-1C) may monitor its own respective real-time ingress traffic. This information about the incoming traffic coming into each network device can then be provided to all other network devices at an interval of time (e.g., every 0.25 seconds to 1 second) and may be used to update the traffic status table. It may be desired that a small fixed interval is chosen to perform better traffic shaping. The frequent evaluation and redistribution may use additional communication bandwidth, however, since updates to the traffic status table may need to be provided via the same network links. The interval of time may be selected by the administrator or configured automatically (e.g., based on traffic).

Once the traffic status table for each of the network devices in the bandwidth management set has been updated, each network device can then perform a bandwidth distribution calculation. Alternatively, the calculation may be performed by the set master and distributed to the network devices in the set. An exemplary calculation may be concerned with ingress traffic for each network device. Such a calculation may follow the following formula:

$$\text{Element Maximum Bandwidth} = \text{Set Maximum Bandwidth} * \frac{\text{Element Local Real-time Traffic}}{\text{Set Total Real-time Traffic}}$$

In other words, the exemplary bandwidth distribution calculation may allocate a maximum bandwidth to each network device based on a proportion of that network device's ingress traffic compared to the overall ingress traffic experienced by the bandwidth management set. As illustrated in FIG. 4, a total ingress traffic of 24 Mbps may be split over the three network devices as follows: network device 1A has 8 Mbps of ingress traffic, 1B has 14 Mbps of ingress traffic, and 1C has 2 Mbps of ingress traffic. By taking into consideration the proportion of the total ingress traffic going through each of the network devices, the maximum network of each network device can be adjusted to better adapt to the current status of the traffic. In particular, although 1A remains at the initial 4 Mbps maximum bandwidth, 1B and 1C are readjusted from the initial 4 Mbps based on their respective ingress traffic to 7 Mbps and 1 Mbps. In this way, the current ingress traffic being experienced by the bandwidth management set can be better handled.

Other exemplary calculations may be performed as part of the bandwidth distribution calculation. For example, higher priority network devices may be provided greater weight when determining each maximum bandwidth.

It should be noted that this calculation can be performed at regular intervals to continually evaluate in real-time the incoming traffic being managed by the bandwidth management set. After each evaluation, it may be determined whether the bandwidth distribution may need to be readjusted dynamically based on changes in traffic. In the prior art, such changes in bandwidth distribution would need to be individually configured by an administrator. Embodiments of the present invention, however, allow bandwidth redistribution to be done automatically if it is determined that a more effective distribution exists to handle the current traffic.

Once the bandwidth distribution calculation has been completed, the values for each maximum bandwidth may then be provided to each respective network device. FIG. 5 illustrates an exemplary bandwidth management per element bandwidth process that may be used in an exemplary system for unified bandwidth management. The assignment of new maximum bandwidths for each network device in the bandwidth management set adjusts the performance of each network device in response to the current ingress traffic. This may ensure that the bandwidth management set handles current ingress traffic in the most efficient manner possible.

New maximum bandwidth values may be based on a real-time evaluation of the ingress traffic. At every fixed period of time, new maximum bandwidth values may be assigned to the network devices of the bandwidth management set. The bandwidth calculations and assignments can be performed automatically within the bandwidth management set without need for an administrator to configure one or more of the network devices.

It should be noted that various embodiments of the present invention may incorporate a particular network device into two or more bandwidth management set. In these embodiments, the particular network device may have separate bandwidth management rules unique to each bandwidth management set. Such information may be communicated by the respective network device in accordance with set communications described above.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for controlling and managing bandwidth traffic in a distributed network, the method comprising:
   receiving one or more messages sent over a communication network from a first defined set of one or more network devices to a first designated set master that manages the first defined set, wherein the received messages concern respective real-time incoming traffic at each network device within the first defined set, and wherein the network devices of the first defined set are configured to transmit information between a first subnet and a second subnet in parallel;
   updating information stored in one or more traffic status tables of the first designated set master regarding the network devices in the first defined set based on the received messages, the stored information including the respective real-time incoming traffic at each network device within the first defined set of network devices;
   sending the updated information from the traffic status tables of the first designated set master to each of the network devices in the first defined set, wherein each of the network devices in the first defined set updates a corresponding traffic status table stored in a respective network device memory in accordance with the updated information sent from the first designated set master,
   storing in memory of the first designated set master a defined overall maximum bandwidth controlling a total bandwidth across the first defined set; and
   executing instructions stored in memory, wherein execution of the instructions by a processor of the first designated set master instructs each of the network devices within the first defined set to calculate an adjusted individual maximum bandwidth based on the updated real-time incoming traffic for the network devices in the first defined set, wherein:
      the adjusted individual maximum bandwidth of all the network devices is limited by the overall maximum bandwidth,
      the one or more traffic status tables at the first designated set master are updated to include information that identifies an amount of real-time ingress traffic received by each of the network devices in the first defined set, and
      each of the network devices in the first defined set automatically adjusts their maximum bandwidth based on the bandwidth distribution calculation performed at each of the network devices in the first defined set, the adjustment including updating the incoming traffic bandwidth distribution for each of the network devices of the first defined set configured to transmit information between the first subnet and the second subnet in parallel.

2. The method of claim 1, further comprising designating a first network device in the first defined set as the set master.

3. The method of claim 1, further comprising executing instructions by the processor, wherein execution of the further instructions:
   initializes the individual maximum bandwidths across the network devices of the first defined set based on the defined overall maximum bandwidth for traffic between a first subnet and a second subnet;
   identifies all network devices corresponding to the first defined set, wherein each network device distributes information about their incoming traffic to other network devices in the same set and is aware of the incoming traffic of the other network devices in the first defined set; and
   updates information stored in a database in memory, wherein the updated information includes the identity of all network devices in the first defined set and each respective network device incoming traffic.

4. The method of claim 3, further comprising adding one or more additional network devices to the set by the first designated set master, wherein adding the additional network devices comprises:
   receiving one or more requests sent over the communication network to the first designated set master, the one or more requests from the one or more additional network devices looking to be added to the set and including information from the one or more additional network devices;
   updating information regarding all network devices stored in a database in memory of the first designated set master, wherein the updated information includes the additional network devices and respective incoming traffic for each of the additional network devices; and
   executing instructions to perform the bandwidth distribution calculation in order to calculate an adjustment to the individual maximum bandwidth of the network devices in the first defined set, inclusive of the additional network devices, based on their respective incoming traffic and the incoming traffic of other network devices in the first defined set, wherein the adjusted individual maximum bandwidth of all the network devices is still controlled by the overall maximum bandwidth for traffic between the first subnet and the second subnet.

5. The method of claim 4, wherein at least one of the additional network devices is added to a second set by a second designated set master of the second set, and the method further comprising:
   receiving information sent over the communication network to the first designated set master, the information concerning the at least one additional network device added to the second defined set;
   updating information stored in memory of the first designated set master, wherein the updated information includes the information regarding the at least one additional network device having been added to the second defined set; and executing by the first designated set master, instructions for each of the network devices within the first defined set to perform the bandwidth distribution calculation to calculate an adjustment to the respective individual maximum bandwidth of each network device in the first defined set based on the updated information, wherein the adjusted individual maximum bandwidths of all the network devices is still controlled by the maximum bandwidth for traffic between the first subnet and the second subnet.

6. The method of claim 1, wherein the adjusted individual maximum bandwidth calculation is based on a proportion of total ingress traffic to a respective network device and the defined overall maximum bandwidth for the set.

7. The method of claim 1, wherein each network device of the first set of network devices stores information about other network devices in the first set of network devices.

8. The method of claim 1, wherein the communication network is a wireless network.

9. An apparatus for controlling and managing bandwidth traffic in a distributed network, the apparatus comprising:
   a communication interface of a first designated set master that receives one or more messages sent over a communication network from a first defined set of one or more network devices to the first designated set master that manages the first defined set, wherein the received messages concern respective real-time incoming traffic at each network device within the first defined set, and wherein the network devices of the first defined set are configured to transmit information between a first subnet and a second subnet in parallel;
   memory that stores in one or more traffic status tables:
      a defined overall maximum bandwidth controlling a total bandwidth across the first defined set, and
      information regarding the network devices in the first defined set; and
   a processor that executes instructions stored in memory, wherein execution of the instructions by the processor updates information stored in the traffic status tables in the memory based on the received messages, wherein the stored information is updated to include the respective real-time incoming traffic at each network device within the first defined set;
   wherein the communication interface sends the updated information from the traffic status table of the first designated set master to each of the network devices in the first defined set, wherein each of the network devices in the first defined set updates a corresponding traffic status table stored in a respective network device memory in accordance with the updated information sent from the first designated set master, each network device in the first defined set being instructed to calculate an adjusted individual maximum bandwidth based on the updated real-time incoming traffic for the network devices in the first defined set, wherein:
      the adjusted individual maximum bandwidth of all the network devices is limited by the overall maximum bandwidth,
      the one or more traffic status tables of the first designated set master are updated to include information that identifies an amount of real-time ingress traffic received by each of the network devices in the first defined set, and
      each of the network devices in the first defined set automatically adjusts their maximum bandwidth based on the bandwidth distribution calculation performed at each of the network devices in the first defined set, the adjustment including updating the incoming traffic bandwidth distribution for each of the network devices of the first defined set configured to transmit information between the first subnet and the second subnet in parallel.

10. The apparatus of claim 9, wherein the processor executes further instructions, wherein execution of the further instructions:
   initializes the individual maximum bandwidths across the network devices of the first defined set based on the defined overall maximum bandwidth for traffic between a first subnet and a second subnet; and
   identifies all network devices corresponding to the same set, wherein each network device distributes information about their incoming traffic to other network devices in the same set and is aware of the incoming traffic of the other network devices in the first defined set, wherein memory is updated with information regarding the identity of all network devices in the first defined set and each respective network device incoming traffic.

11. The apparatus of claim 10, wherein one or more additional network devices is added to the set, wherein adding the additional network devices comprises:
   the communication interface receiving one or more requests sent over the communication network to the first designated set master, the one or more requests from the one or more additional network devices looking to be added to the set and including information from the one or more additional network devices;
   memory being updated with information regarding all network devices stored in a database in memory of the first designated set master, wherein the updated information includes the additional network devices and respective incoming traffic for each of the additional network devices; and
   the processor executing instructions for each network device to perform the bandwidth distribution calculation to calculate an adjustment to the individual maximum bandwidth of each network device in the first defined set based on their respective incoming traffic and the incoming traffic of other network devices in the first defined set, wherein the adjusted individual maximum bandwidth of all the network devices is still controlled by the overall maximum bandwidth for traffic between the first subnet and the second subnet, and wherein each of the network devices in the first defined set automatically adjusts their maximum bandwidth based on the bandwidth distribution calculation.

12. The apparatus of claim 11, wherein at least one of the additional network devices is added to a second set by a second designated set master of the second set, and wherein:
   the communication interface receives information sent over the communication network to the first designated set master, the information concerning the at least one additional network device added to the second defined set;
   memory is updated concerning the information regarding the at least one additional network device having been added to the second defined set; and
   the processor, of each network device in the second set, executes the bandwidth distribution calculation to calculate an adjustment to the respective individual maximum bandwidth based on the updated information, wherein the adjusted individual maximum bandwidths of all the network devices is still controlled by the maximum bandwidth for traffic between the first subnet and the second subnet and wherein each of the network devices in the first defined set automatically adjusts their maximum bandwidth based on the bandwidth distribution calculation performed at each at each of the network devices in the first defined set.

13. The apparatus of claim 9, wherein the adjusted individual maximum bandwidth calculation is based on a proportion of total ingress traffic to a respective network device and the defined overall maximum bandwidth for the set.

14. The apparatus of claim 9, wherein each network device of the first defined set of network devices stores information about other network devices in the first defined set.

15. The apparatus of claim 9, wherein the communication network is a wireless network.

16. A system for controlling and managing bandwidth traffic in a distributed network, the system comprising:
a defined set of a plurality of network devices, wherein one of the network devices is designated set master, wherein the set master comprises:
a communication interface that receives one or more messages sent over a communication network from a first defined set of one or more network devices, wherein the received messages concern respective real-time incoming traffic at each network device within the first defined set, and wherein the network devices of the first defined set are configured to transmit information between a first subnet and a second subnet in parallel;
memory that stores:
one or more traffic status tables,
a defined overall maximum bandwidth controlling a total bandwidth across the defined set, and
information regarding the plurality of network devices, wherein the stored information is updated to include the respective real-time incoming traffic at each network device within the defined set of f network devices
a processor that executes instructions stored in memory, wherein execution of the instructions by the processor updates the stored traffic status table regarding the network devices in the first defined set based on the messages, the stored information including the respective real-time incoming traffic at each network device within the first defined set;
wherein the communication interface sends the updated information from the traffic status table to each of the network devices in the first defined set, wherein each network device in the first defined set of network devices updates a corresponding traffic status table stored in the respective network device memory based on the updated information sent from the set master, each network device in the first defined set being instructed to calculate an adjusted individual maximum bandwidth based on the updated real-time incoming traffic for the network devices in the defined set, wherein
the adjusted individual maximum bandwidth of all the network devices is limited by the overall maximum bandwidth,
the one or more traffic status tables of the first designated set master are updated to include information that identifies an amount of real-time ingress traffic received by each of the network devices in the defined set, and
each of the network devices in the defined set automatically adjusts their maximum bandwidth based on the bandwidth distribution calculation performed at each of the network devices in the defined set, the adjustment including updating the incoming traffic bandwidth distribution for each of the network devices of the first defined set configured to transmit information between the first subnet and the second subnet in parallel.

17. A non-transitory computer-readable storage medium, having embodied thereon a program executable by a processor to perform a method for controlling and managing bandwidth traffic in a distributed network, the method comprising:
receiving one or more messages sent over a communication network from a first defined set of one or more network devices to a first designated set master that manages the first defined set, wherein the received messages concern respective real-time incoming traffic at each network device within the first defined set, and wherein the network devices of the first defined set are configured to transmit information between a first subnet and a second subnet in parallel;
updating information stored in one or more traffic status tables of the first designated set master regarding the network devices in the first defined set based on the received messages, the stored information including the respective real-time incoming traffic at each network device within the first defined set of network devices;
sending the updated information from the traffic status tables of the first designated set master to each of the network devices in the first defined set, wherein each of the network devices in the first defined set updates a corresponding traffic status table stored in a respective network device memory in accordance with the updated information sent from the first designated set master,
storing in memory of the first designated set master a defined overall maximum bandwidth controlling a total bandwidth across the first defined set; and
executing instructions stored in memory, wherein execution of the instructions by a processor of the first designated set master instructs each of the network devices within the first defined set to calculate an adjusted individual maximum bandwidth based on the updated real-time incoming traffic for the network devices in the first defined set, wherein:
the adjusted individual maximum bandwidth of all the network devices is limited by the overall maximum bandwidth,
the one or more traffic status tables at the first designated set master are updated to include information that identifies an amount of real-time ingress traffic received by each of the network devices in the first defined set, and
each of the network devices in the first defined set automatically adjusts their maximum bandwidth based on the bandwidth distribution calculation performed at each of the network devices in the first defined set, the adjustment including updating the incoming traffic bandwidth distribution for each of the network devices of the first defined set configured to transmit information between the first subnet and the second subnet in parallel.

* * * * *